United States Patent [19]
Arioka et al.

[11] Patent Number: 5,415,914
[45] Date of Patent: May 16, 1995

[54] OPTICAL RECORDING DISK

[75] Inventors: Hiroyuki Arioka; Kenji Uchiyama; Mamoru Usami; Atsuko Motai; Toshiki Aoi, all of Nagano, Japan

[73] Assignee: TDK Corporation, Tokyo, Japan

[21] Appl. No.: 72,848

[22] Filed: Jun. 7, 1993

[30] Foreign Application Priority Data

Jun. 30, 1992 [JP] Japan ................... 4-196290
Sep. 1, 1992 [JP] Japan ................... 4-257362

[51] Int. Cl.$^6$ .......................................... B32B 3/00
[52] U.S. Cl. .................................. 428/64; 428/65; 428/457; 428/913; 430/270; 430/945; 346/76 L; 346/135.1
[58] Field of Search .............. 428/64, 65, 457, 913; 430/945, 270; 346/76 L, 135.1

[56] References Cited

U.S. PATENT DOCUMENTS

| | | | |
|---|---|---|---|
| 4,839,883 | 6/1989 | Nagata | 428/64 |
| 5,075,147 | 12/1991 | Usami | 428/64 |
| 5,093,174 | 3/1992 | Suzuki | 428/64 |

FOREIGN PATENT DOCUMENTS

| | | |
|---|---|---|
| 57-202353 | 11/1982 | Japan . |
| 58-176583 | 9/1983 | Japan . |
| 59-256426 | 12/1984 | Japan . |
| 58-176582 | 4/1985 | Japan . |
| 63-252017 | 10/1988 | Japan . |
| 2-58743A | 2/1990 | Japan . |

OTHER PUBLICATIONS

Nikkei Electronics; 23 Jan. 1989; No. 465; p. 107 The Functional Dye Department of the Kinki Chemical Society; 3 Mar. 1989; pp. 15–20.
SPIE; vol. 10978, Optical Recording Topical Meeting; 1989 Hamada et al., pp. 80–87.

*Primary Examiner*—Patrick J. Ryan
*Assistant Examiner*—Elizabeth Evans
*Attorney, Agent, or Firm*—Watson, Cole, Grindle & Watson

[57] ABSTRACT

An optical recording disk includes on a substrate 2, a dye recording layer 3, a lower reflective lamina 4, an upper reflective lamina 5, and a protective coat 6. The lower reflective lamina 4 is formed of Au, Pt, Ag, Al or an alloy thereof and the upper reflective lamina 5 is of a stainless steel composition or an alloy containing 30 wt % or more of Cu and at least one element selected from the group consisting of Zn, Ti, V, Ta, Cr, Mo, W, Mn, Fe, Co, Rh, Ni, Pd, Pt, Ag, Au, Al, Sn, Si, Pb, Cd, Hg, Ca, In, As, Sb, Bi, Se, Te, Ge, N and O. The disk is well reliable and less costly.

15 Claims, 1 Drawing Sheet

OPTICAL RECORDING DISK

FIELD OF THE INVENTION

This invention relates to an optical recording disk having a dye base recording layer of the coating type.

BACKGROUND OF THE INVENTION

Optical recording disks of the write-once, rewritable and other types have been of great interest as high capacity information bearing media. Among the write-once optical recording disks, those having a recording layer predominantly comprising a dye have the advantage of low cost manufacture because the recording layer can be formed by coating.

There were commonly used disks of the air-sandwich structure having an air space on a dye layer. Recently disks of the close contact type having a reflective layer in close contact with a dye layer were proposed because they could be reproduced in accordance with the compact disk (CD) standard. See Nikkei Electronics, Jan. 23, 1989, No. 465, page 107; the Functional Dye Department of the Kinki Chemical Society, Mar. 3, 1989, Osaka Science & Technology Center; and Proceedings SPIE—The International Society for Optical Engineering, Vol. 1078, pages 80–87, "Optical Data Storage Topical Meeting", 17–19, January 1989, Los Angels. The optical recording disks of the close contact type are fabricated by forming a dye layer, a reflective layer and a protective layer on a transparent substrate in the described order so that the reflective layer is in close contact with the dye layer, meeting the disk total thickness of 1.2 mm required by the CD standard.

In order that optical recording disks having a dye base recording layer be reproduced by means of a CD player, a gold (Au) reflective layer is used in one proposal because the aluminum reflective layer used in conventional CDs has insufficient reflectivity. Although gold has high reflectivity and corrosion resistance, it is expensive. It is thus contemplated to use less expensive metals having reflectivity as high as gold, for example, copper and copper alloys.

Disks having reflective layers of copper and copper alloys, however, are less reliable because copper and copper alloys are reactive with the dye, causing deterioration of the dye and a lowering of signal outputs. Especially, copper is chemically reactive with cyanine dyes which are often used in the recording layer. Cyanine dyes are typically used in the form of an ionically bonded combination or a mixture with a metal complex quencher in view of light fastness. Copper is also reactive with the metal complex quencher, raising a further problem.

SUMMARY OF THE INVENTION

Therefore, an object of the present invention is to provide an optical recording disk having a dye base recording layer which is less expensive and highly reliable.

According to the present invention, an optical recording disk includes on a substrate, a recording layer predominantly containing a dye, a reflective layer, and a protective coat. According to the invention, the reflective layer includes double reflective laminae. A lower reflective lamina is formed on the recording layer from at least one member selected from the group consisting of Au, Pt, Ag and Al and alloys thereof. An upper reflective lamina is formed on the lower reflective lamina from a stainless steel composition. Alternatively, the upper reflective lamina contains copper and at least one element selected from the group consisting of Zn, Ti, V, Ta, Cr, Mo, W, Mn, Fe, Co, Rh, Ni, Pd, Pt, Ag, Au, Al, Sn, Si, Pb, Cd, Hg, Ca, In, As, Sb, Bi, Se, Te, Ge, N and O.

Preferably, the lower reflective lamina is formed of at least one member selected from the group consisting of silver, gold and alloys thereof. More preferably, the lower reflective lamina is formed of silver alone or a silver alloy containing at least 90% by weight of silver. The lower reflective lamina has a thickness of at least 200 Å and the lower and upper reflective laminae have a total thickness of at least 500 Å. More preferably, the lower reflective lamina has a thickness of 300 to 2,000 Å.

Also preferably, the upper reflective lamina contains at least 30% by weight, especially at least 50% by weight of copper and at least one element selected from the group consisting of Zn, Ti, V, Ta, Cr, Mo, W, Mn, Fe, Co, Rh, Ni, Pd, Pt, Ag, Au, Al, Sn, Si, Pb, Cd, Hg, Ca, In, As, Sb, Bi, Se, Te, and Ge. The upper reflective lamina has a thickness of 300 to 2,000 Å.

Often the recording layer contains a cyanine dye. The cyanine dye contains an indolenine ring which may have a fused aromatic ring and a pentamethine linkage joined thereto. The cyanine dye is in a bonded combination or a mixture with a singlet oxygen quencher.

Also preferably, the protective coat includes a lower protective lamina of radiation curable resin on the upper reflective lamina so as to cover at least a recordable region and an upper protective lamina of radiation curable resin on the lower protective lamina so as to cover at least the recordable region. The lower protective lamina is formed by spin coating and has a thickness of 1 to 10 μm, the upper protective lamina has a thickness of 1 to 15 μm, and the lower and upper protective laminae have a total thickness of 5 to 18 μm.

In accordance with the invention, a recording layer containing a dye, a reflective layer, and a protective coat are sequentially formed on a substrate to constitute an optical recording disk of the close contact type which can accommodate for the CD standard.

Since reflective layers used in conventional close contact type optical recording disks accommodating for the CD standard generally have a thickness of at least 600 Å in order to provide satisfactory reflectivity and ensure that the recording layer and the reflective layer itself be storage durable, no cost reduction is expectable from reflective layers of gold. Reflective layers of less expensive copper alloys are undesirably reactive with the dye as previously mentioned.

The present invention solves the problem by employing a reflective layer of double ply structure. A lower reflective lamina adjacent to the recording layer is formed from Au or Ag or an alloy containing one or both of them and thus provides a sufficient reflectivity to meet the CD standard and avoids any reaction between it and the recording layer dye. This lower reflective lamina is fully resistant against corrosion by any foreign matter such as oxygen, water, salt and gases which can penetrate through the substrate and the recording layer. Since dye deterioration and a lowering of recorded signal outputs are prohibited, the lower reflective lamina is effective for producing reliable optical recording disks. An upper reflective lamina is formed on the lower reflective lamina, which allows the lower reflective lamina to be thinner and less costly while the reflective layer as a whole maintains satisfactory strength and the lower reflective lamina and recording layer are fully protected. The upper reflective lamina is unlikely to react with the dye due to the intervening lower reflective lamina and provides full corrosion resistance. In the embodiment wherein the lower reflective lamina is formed of relatively low reflectivity metals such as Pt and Al, it should be thinner and the upper reflective lamina should be formed of relatively high reflectivity materials. Then the overall reflective layer is high in reliability and reflectivity.

One preferred embodiment having a lower reflective lamina formed of silver alone or a silver alloy containing at least 90% by weight of silver offers the advantages of high reflectivity and cost reduction. Unlike the reflective layer of gold, the disk of this embodiment does not appear golden in color. This is disadvantageous from a commercial aspect because golden color is one of important design factors for offering attractive outer appearance. The present invention eliminates this disadvantage by forming an upper reflective lamina from a copper alloy where a lower reflective lamina is formed from silver alone or a silver alloy. Particularly when a copper alloy containing more than 30% by weight of copper is used, golden color approximate to gold is developed at a low cost. The upper reflective lamina is also fully resistant against corrosion by any foreign matter such as oxygen, water, salt and gases which can penetrate through the protective coat. In addition, since copper used in the upper lamina is a relatively noble metal like silver used in the lower lamina, the reflective laminae have a minimal potential difference therebetween, produce no local cells and thus remain stable.

Note that Japanese Patent Application Kokai (JP-A) No. 58743/1990 discloses an optical disk in which Au and Al laminae are deposited on a transparent substrate having recorded pits formed in one surface thereof. Since this optical disk is of the read only type based on a transparent substrate having recorded pits formed in one surface thereof, none of the advantages of the present invention are derived therefrom.

DESCRIPTION OF THE PREFERRED EMBODIMENTS

Figure 1:
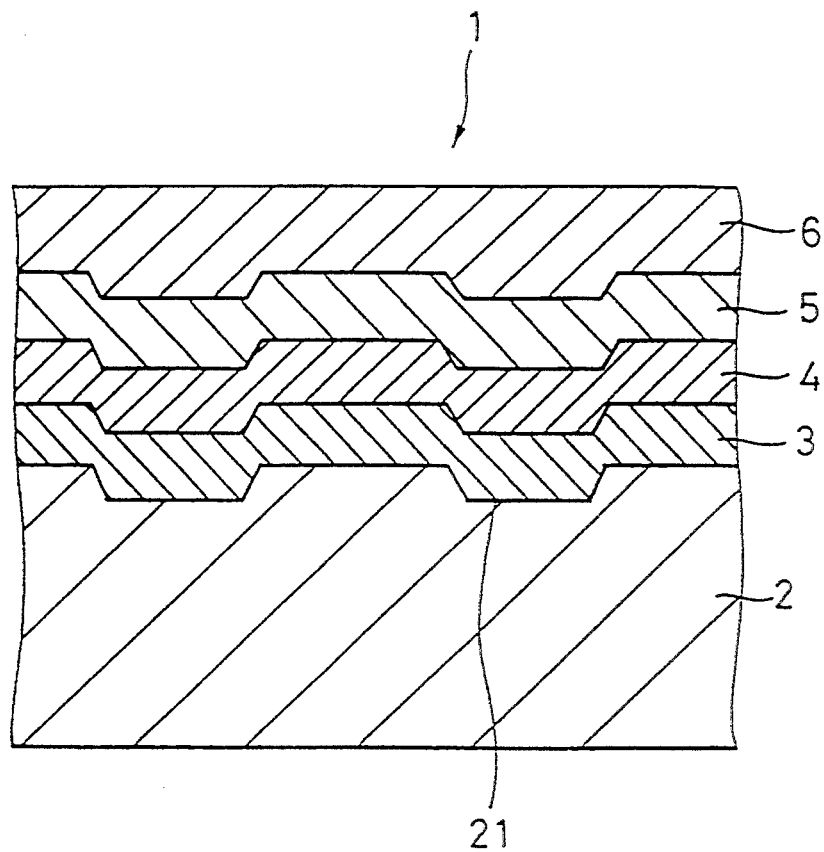
FIG. 1 is a fragmental cross-sectional view of an optical recording disk according to one embodiment of the invention.

The optical recording disk of the invention is an optical recording disk having a dye base recording layer and a reflective layer in close contact therewith and capable of reproduction in accordance with the CD standard.

Referring to FIG. 1, there is schematically illustrated an optical recording disk according to one embodiment of the invention. The optical recording disk 1 shown in FIG. 1 is of the close contact type having a dye base recording layer 3 on one surface of a substrate 2, and further having a lower reflective lamina 4, an upper reflective lamina 5, and a protective coat 6 stacked on the recording layer 3 in the described order in close arrangement.
Substrate The substrate 2 is of conventional disk shape and has commonly used dimensions, for example, a thickness of about 1.2 mm and a diameter of about 80 to 120 mm when the disk is intended for a recordable CD.

The substrate 2 is formed of a resin or glass material which is substantially transparent to recording and reading light, typically a semiconductor laser beam having a wavelength of 600 to 900 nm, especially 700 to 800 nm, most often 780 nm. The substrate material preferably has a transmittance of at least 80% so that recording and reading operation can be made through the substrate 2, that is, from the rear surface of the substrate 2 remote from the recording layer 3.

Preferably, the substrate 2 is formed of resins, typically thermoplastic resins such as polycarbonate resin, acrylic resins, amorphous polyolefins, and TPX using conventional techniques such as injection molding. On the surface of the substrate 2 where the recording layer 3 is formed, the upper surface in the illustrated embodiment, a predetermined pattern, typically a groove 21 is formed for tracking and addressing purposes. Alternatively, a resin layer (not shown) having a predetermined pattern including grooves may be formed on the substrate by 2 P method or the like.

The tracking groove 21 preferably consists of continuous spiral turns. Typically, the groove has a depth of 500 to 3,000 Å and a width of 0.2 to 1.1 $\mu$m, preferably 0.3 to 0.6 $\mu$m (width in a radial direction with respect to the disk center). The adjoining groove turns are separated by a land at a pitch of 0.5 to 1.4 $\mu$m, preferably 1.0 to 1.3 $\mu$m. This groove configuration permits tracking signals to be obtained without reducing the reflection level of the groove. The groove may be provided with asperities for addressing signals. Where the groove is formed in the substrate surface, a provision is preferably made such that recording light may be directed to a recording layer within the groove.
Recording layer The recording layer 3 is formed on the grooved substrate 2 using a dye or a mixture of compatible dyes.

For CD signal recording, the recording layer 3 preferably has a coefficient of extinction (the imaginary part of a complex index of refraction) k of from 0.03 to 0.25 at the wavelength of recording and reading light. With a coefficient of extinction k of less than 0.03, the recording layer can have a lower absorptivity so that it might become difficult to record with a commonly used power. A coefficient of extinction k of more than 0.25 can result in a drop of reflectivity to below 60%, often failing to reproduce according to the CD standard. Better results are obtained with k=0.03 to 0.20, especially 0.03 to 0.15.

The recording layer preferably has an index of refraction (the real part of a complex index of refraction) n of from 1.8 to 4.0, more preferably 2.0 to 3.0 at the wavelength of recording and reading light. With n<1.8, the reflectivity and signal modulation would be reduced, often failing to read by CD players. Few dyes have n>4.0.

The light absorbing dyes used herein preferably have maximum absorption at a wavelength in the range of from 600 to 900 nm, more preferably from 600 to 800 nm, most preferably from 650 to 750 nm. Such a light absorbing dye is preferably selected from cyanine dyes, phthalocyanine dyes, naphthalocyanine dyes, anthraquinone dyes, azo dyes, triphenylmethane dyes, pyrylium dyes, thiapyrylium dyes, squalirium dyes, chroconium dyes, and metal complex dyes alone or in admixture of two or more. The advantages of the invention become more prominent when the dyes are cyanine dyes because they are reactive with copper alloys and similar metals.

Preferred cyanine dyes are cyanine dyes having an indolenine ring which may have a fused aromatic ring, especially a benzoindolenine ring. More preferred cyanine dyes have indolenine rings coupled through a pentamethine linkage.

A light absorbing dye may be used in admixture with a singlet oxygen quencher. Also a photo-stabilized dye, that is, an ionic combination or ionically bonded compound of a dye cation and a singlet oxygen quencher anion is a useful light absorbing dye.

The quenchers used herein include metal complexes of acetylacetonates, bisdithiols such as bis(dithio-α-diketones) and bisphenyldithiols, thiocatechols, salicylaldehydeoximes, and thiobisphenolates. Also useful are amine quenchers such as amine compounds having a nitrogenous radical cation and hindered amines.

For the ionically bonded combination, cyanine dyes having indolenine rings and metal complex quenchers such as bisphenyldithiol metal complexes are preferred.

With regard to the dyes, quenchers and their combinations, reference is made to "Chemistry of Functional Dyes", CMC Publishing K.K., pages 74–76 as well as the following patent applications.

| Japanese Patent Application Kokai (JP-A) Nos. | | |
| --- | --- | --- |
| 24692/1984 | 55794/1984 | 55795/1984 |
| 81194/1984 | 83695/1984 | 18387/1985 |
| 19586/1985 | 19587/1985 | 35054/1985 |
| 36190/1985 | 36191/1985 | 44554/1985 |
| 44555/1985 | 44389/1985 | 44390/1985 |
| 47069/1985 | 20991/1985 | 71294/1985 |
| 54892/1985 | 71295/1985 | 71296/1985 |
| 73891/1985 | 73892/1985 | 73893/1985 |
| 83892/1985 | 85449/1985 | 92893/1985 |
| 159087/1985 | 162691/1985 | 203488/1985 |
| 201988/1985 | 234886/1985 | 234892/1985 |
| 16894/1986 | 11292/1986 | 11294/1986 |
| 16891/1986 | 08384/1986 | 14988/1986 |
| 163243/1986 | 210539/1986 | 30083/1987 |
| 32132/1987 | 31792/1987 | |
| Japanese Patent Application No. 54013/1985 | | |

It should be understood that the quencher which may be added either separately from the light absorbing dye or in the bonded form should preferably be added in an amount of up to about 1 mol, especially about 0.05 to 0.5 mol per mol of the light absorbing dye or dyes because better light resistance is expectable.

The dye used in the recording layer may be selected from the above-mentioned light absorbing dyes, dye-quencher mixtures, and bonded dye-quencher compounds as long as it has n and k in the above-defined ranges. If desired, a dye of a new design molecular structure may be synthesized.

The coefficient of extinction k of a dye with respect to recording and reading light generally varies over the range of from 0 to about 2 depending on its skeleton and substituent. In selecting a dye having a coefficient of extinction k of 0.03 to 0.25, for example, some limitations are imposed on its skeleton and substituent. Then the coating solvent is limited as the case may be. Some dyes cannot be applied to certain substrates or some cannot be deposited from a gas phase. Further, determining a new molecular design requires an increased amount of labor for design and synthesis.

Through experiments, the inventors found that a dye layer formed of a mixture of at least two dyes has a coefficient of extinction k which is determined from the coefficients of extinction k of the layers consisting of the respective dyes alone, in substantial proportion to the ratio of the dyes. Thus it is possible to form the recording layer from a compatible mixture of two or more dyes.

Most mixtures of dyes have a coefficient of extinction k substantially proportional to the mixing ratio of dyes. More particularly, a mixture of i types of dye has a coefficient of extinction k substantially equal to $\Sigma C_i k_i$ wherein the i-th dye has a coefficient of extinction $k_i$ and a mixing fraction $C_i$. Thus a dye layer having k=0.03 to 0.25 may be formed by mixing dyes having different k in a controlled mixing ratio. This, in turn, means that the dyes used herein can be selected from a wider variety.

The same principle as above can be applied to an improvement in wavelength dependency. In general, a semi-conductor laser produces a beam having a wavelength width of ±10 nm. Commercial CD players require a reflectivity of at least 70% in the wavelength range between 770 nm and 790 nm. Generally, the coefficient of extinction k of a dye is largely dependent on a wavelength. Some dyes can have an adequate coefficient k at 780 nm, but a largely deviated coefficient k at 770 or 790 nm. In this case, two distinct dyes may be mixed to form a mixture which has adequate values of k and n over the wavelength range of 780±10 nm.

This eliminates the limitation of film formation such as limitation of a coating solvent and allows for the use of a readily synthesizable, inexpensive dye, a dye having excellent properties, or a sparingly soluble dye.

Where the recording layer is formed of a mixture of dyes, the dyes may be selected from those having an index of refraction n=1.6 to 6.5 and a coefficient of extinction k=0 to 2.

In determining n and k, a sample is prepared by forming a recording layer on a given transparent substrate to a thickness of about 400 to 1,000 Å. Then the reflectivity of the sample is measured through the substrate or from the recording layer side. Reflectivity is measured in a specular reflection mode (of the order of 5°) using light having the recording/reproducing wavelength. The transmittance of the sample is also measured. The index of refraction n and coefficient of extinction k may be calculated from these measurements according to K. Ishiguro, "Optics," Kyoritsu Publishing K.K., pages 168–178.

In the practice of the invention, the recording layer 3 is often formed by spin coating, more particularly by dissolving the dye in a suitable organic solvent and applying and spreading the coating solution on a substrate while rotating the substrate. The coating is dried after spin coating, if desired. The organic solvents used herein include alcohols, ketones, esters, ethers, aromatics, and alkyl halides, with organic solvents having two or more functional groups in a molecule being preferred.

Preferably, the recording layer thus formed has a thickness of about 1,000 to about 3,000 Å although the exact thickness depends on the reflectivity or the like.

Reflective layer

Formed on and in close contact with the recording layer 3 is the lower reflective lamina 4. The lower reflective lamina is formed of at least one member selected from the group consisting of Au, Pt, Ag and Al and alloys thereof. Among these, metals Au and Ag or alloys containing at least one of Au and Ag are preferred for reflectivity. Higher reflectivity is available from alloys containing at least one of Au and Ag in a (total) content of at least 60% by weight.

Formed on and in close contact with the lower reflective lamina 4 is the upper reflective lamina 5. The upper reflective lamina is formed of a stainless steel composition or contains copper and at least one element selected from the group consisting of Zn, Ti, V, Ta, Cr, Mo, W, Mn, Fe, Co, Rh, Ni, Pd, Pt, Ag, Au, Al, Sn, Si, Pb, Cd, Hg, Ca, In, As, Sb, Bi, Se, Te, Ge, N and 0.

One embodiment wherein the upper reflective lamina is formed of a stainless steel composition is preferred because a passivated stratum is formed at the top surface of the upper reflective lamina for preventing further penetration of gases and water from the protective coat. The stainless steel composition used herein refers to alloy compositions containing Fe, Cr, Ni and optionally, at least one element selected from C, Mo, Ti, Nb, Al, Cu, P, N, Be, etc. which are generally known as stainless steel.

In another embodiment wherein the upper reflective lamina contains copper, at least one additional element is preferably selected from the group consisting of Zn, Ti, V, Ta, Cr, Mo, W, Mn, Fe, Co, Rh, Ni, Pd, Sn, Si, Pb, Cd, Hg, Ca, In, As, Sb, Bi, Se, Te, Ge, Pt, Ag, Au, and Al, especially from the group consisting of Zn, Sn, Rh, Fe, Ni, Mn, Pd, Pt, Ag, Au, and Al.

In the case of copper alloy, the content of elements in the upper reflective lamina varies with the type of element. For alloys containing copper and at least one element selected from the group consisting of Zn, Ti, V, Ta, Cr, Mo, W, Mn, Fe, Co, Rh, Ni, Pd, Sn, Si, Pb, Cd, Hg, Ca, In, As, Sb, Bi, Se, Te, Ge, Pt, Ag, Au, and Al, the content of Cu in the upper reflective lamina is preferably at least 30% by weight, more preferably at least 50% by weight. The upper limit, though not critical, is preferably 95% by weight, more preferably 90% by weight because copper alone is somewhat low in corrosion resistance. A lamina containing less than 30% by weight of Cu would provide less reflectivity.

Nitrogen and/or oxygen is contained in an amount of 0.1 to 2.0% by weight (in total when both are used) of the upper reflective lamina. Thin films substantially free of O, but containing N are preferred. Beyond the range, reflectivity would be too low to provide a reflection level required for reproduction. Below the range, corrosion resistance would be low. For these reasons, the upper limit of the N and O content in the upper reflective lamina is preferably 1.8 wt %, more preferably 1.6 wt %, most preferably 1.4 wt %. The lower limit of the N and O content is preferably 0.2 wt %, more preferably 0.3 wt %, most preferably 0.5 wt %.

The lower and upper reflective laminae 4 and 5 can be formed by any desired physical or chemical vapor deposition method, for example, sputtering and evaporation. A lamina of stainless steel composition can be formed by using stainless steel as a sputtering target or evaporation source. When it is desired to form a thin film containing Cu and N and/or O, reactive sputtering is preferably carried out in an atmosphere containing $N_2$ and/or $O_2$ in Ar gas.

The lower reflective lamina 4 preferably has a thickness of at least about 200 Å. Below this limit, reflectivity becomes low. For cost reduction, the lower reflective lamina should preferably have a thickness of up to 550 Å.

The total thickness of the lower and upper reflective laminae should preferably be at least 500 Å. A total thickness below this limit would provide insufficient strength, allow penetration of gases and water and provide insufficient protection of the recording layer. No upper limit is imposed onto the total thickness although a thickness in excess of 2,000 Å is unnecessary.

The reflective layer consisting of lower and upper reflective laminae by itself has a reflectivity of at least 90% with respect to incident light from the lower reflective lamina. In optical recording disk form, the reflectivity of unrecorded portions of the disk through the substrate can be at least 60%, especially at least 70%.

The lower reflective lamina has insufficient reflectivity where it is formed of Pt and/or Al or where it is formed of Au and/or Ag in a low (total) content (e.g., less than 60% by weight). In these cases, the lower reflective lamina is made thin and the upper reflective lamina is designed to have higher reflectivity so that the entire reflective layer is improved in reflectivity. More specifically, the lower reflective lamina is preferably less than 200 Å thick. However, the lower reflective lamina should preferably be at least 50 Å thick because a lamina of less than 50 Å thick permits the dye in the recording layer to be affected by the upper reflective lamina. In these cases, the upper reflective lamina should preferably contain at least 60% by weight of Au and/or Ag, and the total thickness of the lower and upper reflective laminae should preferably be at least 600 Å.

Preferred combinations of the lower and upper reflective laminae are described.

The lower reflective lamina is preferably formed of Au alone or Ag alone, especially Au alone in order to provide high reflectivity. A compromise with cost reduction recommends to use silver alone or silver alloys containing at least 90% by weight, especially at least 95% by weight of Ag, with silver alone being most preferred. High reflectivity is available with silver alone and silver alloys containing at least 90% by weight of Ag which are less expensive than gold and platinum. Additionally, silver is a noble metal and less reactive with the dye in the recording layer and more corrosion resistant against oxygen, water, salt, and gases penetrating through the substrate and recording layer. Less contents of Ag provide less reflectivity, less prevention against reaction with the dye and less corrosion resistance. It is not recommended that a metal having greater ionization tendency than Ag be contained in excess of 10% by weight in the lower reflective lamina since such a metal is more reactive with the dye (inclusive of the quencher-bonded dye) and quencher in the recording layer.

In combination with the lower reflective lamina of silver alone or silver alloys, copper alloys are used as the upper reflective lamina.

Preferred copper alloys contain copper and at least one element selected from the group consisting of Zn, Ti, V, Ta, Cr, Mo, W, Mn, Fe, Co, Rh, Ni, Pd, Sn, Si, Pb, Cd, Hg, Ca, In, As, Sb, Bi, Se, Te, Ge, Pt, Ag, Au, and Al, especially from the group consisting of Zn, Sn, Rh, Fe, Ni, Mn, Pd, Pt, Ag, Au, and Al.

Copper contents of at least 30% by weight are preferred as previously described because alloys having such copper contents appear golden and offer an aesthetically high grade look without a need for gold. Such copper alloys are less expensive, of course, and more corrosion resistant against oxygen, water, salt, and gases penetrating through the substrate and recording layer. Additionally, since copper is a noble metal like silver used in the lower reflective lamina, only a little potential difference develops between the upper and lower reflective laminae so that they remain stable without creating a local galvanic cell. Alloys having lower copper contents are less golden in color and less corrosion resistant. For cost reduction, it is preferred to omit gold. Alloys of copper with base metal are less stable since they tend to create local cells at low Cu contents.

In these preferred combinations, the lower reflective lamina of Ag system preferably has a thickness of 300 to 2,000 Å, more preferably 300 to 1,000 Å because high reflectivity is available and because it becomes possible to take advantage of the fact that an Ag film of more than 300 Å thick has higher reflectivity than Au at about 780 nm.

The upper reflective lamina of Cu system preferably has a thickness of 300 to 2,000 Å, more preferably 300 to 1,000 Å because high corrosion resistance is available.

The total thickness of the lower and upper reflective laminae is theoretically up to 4,000 Å although a total thickness in excess of 2,000 Å is unnecessary as previously described.

Protective coat

The protective coat 6 is formed on the upper reflective lamina 5. The protective coat is preferably formed by spin coating in order to avoid any damage to the upper reflective lamina while other coating methods including screen printing, dipping and spray coating may be used. The conditions under which the protective coat is formed may be determined by taking into account the viscosity of a coating composition, the desired coating thickness, and other factors without undue experimentation.

The protective coat is preferably about 1 to 20 μm thick. Thinner coats provide less protection against corrosion of the reflective layer and recording layer whereas thicker coats tend to crack due to shrinkage upon curing or cause warpage of the disk.

The protective coat is preferably formed from a radiation-curable resin. More particularly, it is formed by coating a radiation-curable compound or a polymerizable composition thereof and curing the coating with radiation. The radiation-curable compounds used herein include monomers, oligomers, and polymers having incorporated in their molecule a group capable of crosslinking or polymerization upon exposure to radiation, for example, an acrylic double bond as given by acrylic acid, methacrylic acid and their esters which are sensitive to ionization energy and capable of radical polymerization, an allyl double bond as given by diallyl phthalate, and an unsaturated double bond as given by maleic acid and maleic derivatives. They are preferably polyfunctional, especially at least trifunctional and may be used alone or in admixture of two or more.

The radiation-curable monomers are usually compounds having a molecular weight of lower than 2,000 and the oligomers are those having a molecular weight of 2,000 to 10,000. Examples include acryl-containing monomers and oligomers such as styrene, ethylacrylate, ethylene glycol diacrylate, ethylene glycol dimethacrylate, diethylene glycol diacrylate, diethylene glycol methacrylate, 1,6-hexaneglycol diacrylate, 1,6-hexaneglycol dimethacrylate, and more preferably pentaerythritol tetraacrylate (and methacrylate), pentaerythritol triacrylate (and methacrylate), trimethylolpropane triacrylate (and methacrylate), trimethylolpropane diacrylate (and methacrylate), acryl modified products of urethane elastomers, and derivatives thereof having a functional group such as COOH incorporated therein, acrylates and methacrylates of phenol ethylene oxide adducts, and compounds having a pentaerythritol fused ring having an acryl or methacryl group or ε-caprolactone-acryl group attached thereto as disclosed in Japanese Patent Application No. 72888/1987, and special acrylates as disclosed in Japanese Patent Application No. 72888/1987. Other radiation-curable oligomers include oligoester acrylates, acryl modified urethane elastomers and their derivatives having a functional group such as COOH incorporated therein.

In addition to or instead of the above-mentioned compounds, radiation-curable compounds obtained by modifying thermoplastic resins so as to be radiation sensitive may be used. Examples of such radiation-curable resins include thermoplastic resins having incorporated in their molecule a group capable of crosslinking or polymerization upon exposure to radiation, for example, an acrylic double bond as given by acrylic acid, methacrylic acid and their esters having a radically polymerizable unsaturated double bond, an allyl double bond as given by diallyl phthalate, and an unsaturated bond as given by maleic acid and maleic derivatives. Examples of the thermoplastic resins which can be modified to be radiation curable include vinyl chloride copolymers, saturated polyester resins, polyvinyl alcohol resins, epoxy resins, phenoxy resins, and cellulosic derivatives. Other resins which can be modified to be radiation curable include polyfunctional polyesters, polyether ester resins, polyvinyl pyrrolidone resins and derivatives thereof (e.g., PVP olefin copolymers), polyamide resins, polyimide resins, phenolic resins, spiroacetal resins, and acrylic resins containing at least one acryl ester and methacryl ester containing a hydroxyl group as a polymerizing component.

The radiation to which the coating is exposed may be ultraviolet (UV) radiation, electron radiation, or the like, with UV being preferred. For UV curing, photo-polymerization initiators or sensitizers are generally added to the radiation-curable compounds. Any desired photo-polymerization initiator or sensitizer may be used, for example, acetophenones, benzoins, benzophenones, and thioxanthones. A mixture of photo-polymerization initiators may be used. The polymerizable composition generally contains about 0.5 to 5% by weight of photo-polymerization initiator. Such a polymerizable composition may be synthesized by conventional methods or prepared by mixing commercially available compounds.

Another preferred composition containing a radiation-curable compound of which the protective coat is formed is a composition containing an epoxy resin and a cationic photo-polymerization catalyst. The epoxy resins used herein are preferably alicyclic epoxy resins, especially those having at least two epoxy groups in a molecule. Examples of the alicyclic epoxy resin include 3,4-epoxycyclohexylmethyl-3,4-epoxycyclohexanecarboxylate, bis(3,4-epoxycyclohexylmethyl)-adipate, bis(3,4-epoxycyclohexyl) adipate, 2-(3,4-epoxycyclohexyl-5,5-spiro-3,4-epoxy)cyclohexane-meta-dioxane, bis(2,3-epoxycyclopentyl) ether, and vinylcyclohexene dioxide. The alicyclic epoxy resin preferably has an epoxy equivalent of 60 to 300, especially 100 to 200 for better curing though not limited thereto.

Well-known cationic photo-polymerization catalysts may be used. Examples include metal fluoroborate salts, boron trifluoride complexes, bis(perfluoroalkyl sulfonyl)methane metal salts, aryldiazonium compounds, aromatic onium salts of Group 6A elements, aromatic onium salts of Group 5A elements, dicarbonyl chelates of Group 3A to 5A elements, thiopyrilium salts, Group 6A elements having a $MF_6$ anion wherein M is P, As or Sb, triarylsulfonium complex salts, aromatic iodonium complex salts, and aromatic sulfonium complex salts, with the polyarylsulfonium complex salts, aromatic sulfonium and iodonium complex salts of halogen-containing complex ions, and aromatic onium salts of Group 3A, 5A and 6A elements being preferred.

Also useful are cationic photo-polymerization catalysts containing an organometallic compound and a photo-decomposable organic silicon compound. These cationic photo-polymerization catalysts are non-strong acid systems and avoid any detrimental influence to the sensitive recording layer of the optical recording disk. The organometallic compounds include complex compounds having alkoxy, phenoxy, $\beta$-diketonato and other groups coordinated to a metal atom such as Ti, V, Cr, Mn, Fe, Co, Ni, Cu, Zn, Al and Zr. Preferred among these are organic aluminum compounds, for example, trismethoxy aluminum, trispropionato aluminum, tristrifluoroacetyl aluminum, and trisethylacetoacetonato aluminum. The photo-decomposable organic silicon compounds yield silanol upon exposure to light such as ultraviolet radiation and include silicon compounds having a peroxysilano, o-nitrobenzyl or $\alpha$-ketosilyl group.

Preferably the composition contains about 0.05 to 0.7 parts, especially about 0.1 to 0.5 parts by weight of the cationic photo-polymerization catalyst per 100 parts by weight of the epoxy resin.

More preferably, a composition containing an acryl-containing compound as a radiation curable compound and a photo-polymerization initiator or sensitizer is coated and cured with radiation, typically UV radiation.

In forming a protective coat, a coating of a polymerizable composition as defined above is exposed to UV radiation, or heated and then exposed to UV radiation if desired. Electron radiation may be used instead of UV radiation. Typically, coatings are exposed to UV radiation at an intensity of at least about 50 mW/cm$^2$ and a dose of about 500 to 2,000 mJ/cm$^2$. The UV radiation source may be any of conventional ones such as mercury lamps. On UV exposure, the compounds undergo radical polymerization.

Various pigment particles may be contained in the protective coat, if desired.

On the protective coat 6, there may be formed a labeling layer in the form of at least one printed layer. The labeling layer is preferably formed by printing a radiation-curable resin composition containing a pigment and curing it. Alternatively, a thermosetting ink composition may be used.

Although the protective coat 6 is a single layer in FIG. 1, it may be of a multi-layer structure.

Where the protective coat is of a two-layer structure, a lower protective lamina is formed on the upper reflective lamina and an upper protective lamina is formed on the lower protective lamina. Preferably the lower and upper protective laminae cover at least a recordable region. By providing double protective laminae, coating defects in the respective laminae are offset so that the overall protective coat may have improved corrosion resistance.

The lower protective lamina preferably has a thickness of about 1 to 10 $\mu$m, especially about 3 to 8 $\mu$m and the upper protective lamina preferably has a thickness of about 1 to 15 $\mu$m, especially about 3 to 15 $\mu$m. Thinner laminae are less effective for improving corrosion resistance whereas thicker laminae tend to crack due to shrinkage upon curing or cause warpage of the disk. The total thickness of the lower and upper protective laminae is preferably about 5 to 18 $\mu$m. A total thickness below the range is less effective for improving corrosion resistance whereas beyond the range, the disk can distort when used under severe conditions like hot humid conditions.

The lower protective lamina is preferably formed by spin coating in order to avoid any damage to the upper reflective lamina while the upper protective lamina may be formed by conventional coating methods including spin coating, screen printing, dipping and spray coating. The upper protective lamina is formed after the lower protective lamina has been cured. Where the upper protective lamina is formed by screen printing, it is possible to selectively coat it only on the recordable region unlike the spin coating method. This saves the amount of resin used.

The materials of which the lower and upper protective laminae are made are the same as described for the protective coat. In a two-layered protective coat, a labeling layer is normally formed on the upper protective lamina although it may be formed between the lower and upper protective laminae. In the latter case, following curing of the lower protective lamina, a labeling layer is printed and cured and thereafter, the upper protective lamina is printed and cured.

Moreover, an intermediate protective coat of a radiation-curable resin in the form of at least one layer may be formed between the lower and upper protective laminae so as to cover at least the recordable region. The intermediate protective coat is not limited with respect to composition and forming method and may be formed in accordance with the upper protective lamina. It is to be noted that the protective coat should preferably have a total thickness of up to 18 $\mu$m even when it consists of three or more laminae.

In the case of a multi-layered protective coat, it should preferably be free of a pigment. Elimination of a pigment is preferred in curing the resin and ensures formation of a transparent protective coat which allows for easy inspection of the reflective layer for defects. For the multi-layered protective coat, reference is made to Japanese Patent Application No. 151587/1992.

Operation

Recording or additional recording may be carried out on the optical recording disk 1 of the above-described construction by directing recording light having a wavelength of 780 nm, for example, in pulse form to the recording layer 3 in the groove 21 through the substrate 2 to form an irradiated or recorded spot whose optical reflectivity has changed. The recording layer 3 absorbs light so that it is heated while the substrate 2 is heated at the same time. As a result, the recording material, typically dye melts or decomposes near the interface between the substrate 2 and the recording layer 3, probably applying a pressure to the interface to deform the bottom and side walls of the groove 21.

EXAMPLE

Examples of the present invention are given below by way of illustration and not by way of limitation.

EXAMPLE 1

An optical recording disk sample as shown in FIG. 1 was prepared by starting with a polycarbonate resin substrate having a continuous spiral groove and a diameter of 120 mm and a thickness of 1.2 mm. A recording layer 3 containing a dye was formed on the substrate 2 by spin coating. Then lower and upper reflective laminae 4 and 5 were formed on the recording layer 3, and a protective coat 6 was formed thereon.

The coating solution used in forming the recording layer contained a dye and an organic solvent. The dye was a mixture of 60% by weight of dye A1, 30% by weight of dye A2, and 10% by weight of singlet oxygen quencher Q, all defined below.

The organic solvent used was diacetone alcohol. The coating solution contained 5% by weight of the dye. The recording layer was 200 nm thick.

The lower and upper reflective laminae were formed by sputtering. The composition and thickness of the respective reflective laminae are shown in Table 1. For comparison purposes, a sample free of an upper reflective lamina was fabricated.

The protective coat was formed by spin coating a UV-curable resin available as SD-17 from Dai-Nippon Ink K.K. and curing it with UV radiation. It was 5 μm thick at the end of curing.

Using a commercially available CD player for reading, the disk samples were measured for C1 error both at the initial and after 100 hour storage in a 80° C./RH 80% environment. C1 errors were counted for 10 minutes and an average value per second was calculated. The CD standard prescribes a C1 error of up to 220 counts/sec.

The results are shown in Table 1.

TABLE 1

| Sample No. | Composition (wt %) Lower reflective lamina | Composition (wt %) Upper reflective lamina | Thickness (Å) Lower reflective lamina | Thickness (Å) Upper reflective lamina | C1 error (counts/sec.) Initial | C1 error (counts/sec.) Storage** |
|---|---|---|---|---|---|---|
| 1* | 58Cu-42Ag | — | 1000 | — | 0.6 | 500 |
| 2 | Au | 58Cu-42Ag | 200 | 800 | 0.5 | 2.0 |
| 3 | Pt | 85Cu-15Al | 100 | 900 | 1.2 | 5.3 |
| 4 | Ag | 18-8 stainless steel | 400 | 200 | 0.5 | 1.5 |

*comparison
**after storage at 80° C./RH 80% for 100 hours

Advantages of the invention are evident from Table 1.

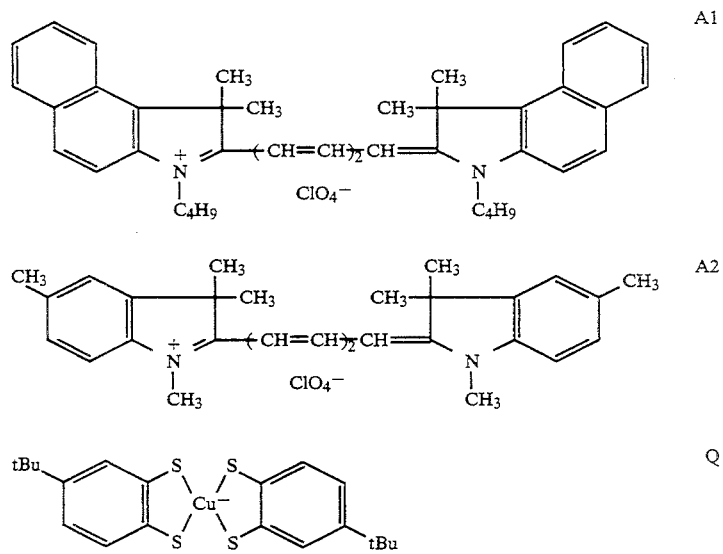

EXAMPLE 2

A disk sample was fabricated by the same procedure as sample No. 4 of Example 1 except that the upper reflective lamina was omitted and only the lower reflective lamina of 500 Å thick was formed. The recording layer contained the following ionically bonded dye-quencher compound A3 in the same amount as in Example 1. This is designated sample No. 21.

Dye A3

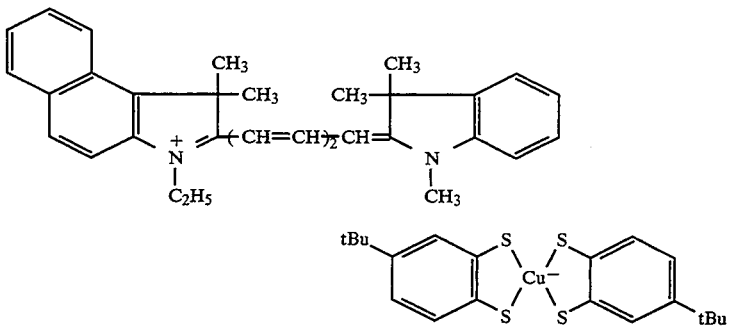

Samples were fabricated in the same manner as sample No. 21 except that an upper reflective lamina of the composition shown in Table 2 was formed on the lower reflective lamina. The upper reflective lamina was 500 Å thick in all the samples.

These samples were measured for C1 error as in Example 1. Additionally, the reflectivity at the land was measured both at the initial and after 100 hour storage in a 80° C./RH 80% environment. The CD standard prescribes a reflectivity at the land of at least 70%.

The results are shown in Table 2.

TABLE 2

| Sample No. | Upper reflective lamina composition (wt %) | | | | | | | C1 error (counts/sec.) | | Reflectivity (%) | |
| | Cu | Fe | Zn | Al | Mn | Ni | other | Initial | Storage* | Initial | Storage** |
| --- | --- | --- | --- | --- | --- | --- | --- | --- | --- | --- | --- |
| 21* | — | — | — | — | — | — | — | 0.5 | 550 | 74 | 62 |
| 22 | 20 | 15 | 65 | — | — | — | — | 1.2 | 200 | 75 | 71 |
| 23 | 72 | — | — | — | — | — | 28Ag | 0.7 | 1.5 | 75 | 73 |
| 24 | 65 | — | 35 | — | — | — | — | 0.6 | 1.5 | 74 | 72 |
| 25 | 88 | 3 | — | 7 | 1 | 1 | — | 0.6 | 1.0 | 74 | 72 |
| 26 | 65 | 3 | 23 | 5 | 4 | — | — | 0.7 | 2.0 | 75 | 72 |
| 27 | 82 | 4 | — | 9 | 1 | 4 | — | 1.0 | 1.5 | 75 | 72 |
| 28 | 68 | 1 | — | — | 1 | 30 | — | 0.8 | 1.0 | 74 | 73 |
| 29 | 85 | 3 | — | 8 | 1 | 3 | — | 0.6 | 1.5 | 75 | 72 |
| 30 | 55 | 1 | 24 | 1 | 14 | 5 | — | 0.5 | 1.5 | 75 | 72 |
| 31 | 89 | — | 10 | — | — | — | 1Sn | 0.6 | 0.8 | 75 | 73 |
| 32 | 86 | — | 12 | — | — | — | 2Sn | 0.6 | 0.8 | 75 | 73 |

*comparison
**after storage at 80° C./RH 80% for 100 hours

Advantages of the invention are evident from Table 2.

EXAMPLE 3

A disk sample was fabricated by the same procedure as sample No. 31 of Example 2 except that after a lower protective lamina of 5 μm thick was formed as in Example 2, a lower protective lamina of 10 μm thick was formed by screen printing a UV-curable resin (UVOPT550 Clear available from Teikoku Ink K.K.) over the entire surface of the lower protective lamina and curing the coating with UV radiation. A labeling layer was formed on the upper protective lamina by screen printing. This is designated sample No. 41.

Sample No. 41 was measured for C1 error and reflectivity as in Example 2 to find at least equivalent, often better results. This means that a protective coat of double layer structure improves corrosion resistance and prevents deterioration during storage under hot humid conditions.

When copper alloys containing copper and at least one element selected from the group consisting of Zn, Ti, V, Ta, Cr, Mo, W, Mn, Fe, Co, Rh, Ni, Pd, Pt, Ag, Au, Al, Sn, Si, Pb, Cd, Hg, Ca, In, As, Sb, Bi, Se, Te, Ge, N and O in combinations other than those shown in Tables 1 and 2 were used as the upper reflective lamina in the foregoing examples, there were obtained equivalent results in accordance with the content of Cu.

Although some preferred embodiments have been described, many modifications and variations may be made thereto in the light of the above teachings. It is therefore to be understood that within the scope of the appended claims, the invention may be practiced otherwise than as specifically described.

We claim:

1. An optical recording disk, comprising:
   a substrate,
   a recording layer coated on the substrate, said recording layer predominantly containing a dye,
   a lower reflective lamina on said recording layer, said lower reflective lamina containing at least one of Au, Pt, Ag and Al,
   an upper reflective lamina on said lower reflective lamina, said upper reflective lamina being formed of at least 30% by weight of copper and at least one element selected from the group consisting of Zn, Ti, V, Ta, Cr, Mo, W, Mn, Fe, Co, Rh, Ni, Pd, Pt, Ag, Au, Al, Sn, Si, Pb, Cd, Hg, Ca, In, As, Sb, Bi, Se, Te, Ge, and
   a protective coat on said upper reflective lamina.

2. The optical recording disk of claim 1 wherein said lower reflective lamina contains at least one of silver and gold.

3. The optical recording disk of claim 2 wherein said lower reflective lamina has a thickness of at least 200 Å and said lower and upper reflective laminae have a total thickness of at least 500 Å.

4. The optical recording disk of claim 3, wherein said lower reflective lamina is formed of silver alone or a silver alloy containing at least 90% by weight of silver.

5. The optical recording disk of claim 4, wherein said lower reflective lamina has a thickness of 300 to 2,000 Å.

6. The optical recording disk of claim 2 wherein said lower reflective lamina is formed of silver alone or a silver alloy containing at least 90% by weight of silver.

7. The optical recording disk of claim 6 wherein said lower reflective lamina has a thickness of 300 to 2,000 Å.

8. The optical recording disk of claim 1 wherein said upper reflective lamina contains at least 50% by weight of copper.

9. The optical recording disk of claim 8, wherein said upper reflective lamina has a thickness of 300 to 2,000 Å.

10. The optical recording disk of claim 1 wherein said upper reflective lamina has a thickness of 300 to 2,000 Å.

11. The optical recording disk of claim 1 wherein said recording layer contains a cyanine dye.

12. The optical recording disk of claim 11 wherein said cyanine dye contains an indolenine ring which may have a fused aromatic ring, and a pentamethine linkage joined thereto.

13. The optical recording recording disk of claim 12, wherein said cyanine dye is in bonded combination or a mixture with a singlet oxygen quencher.

14. The optical recording disk of claim 11 wherein said cyanine dye is in a bonded combination or a mixture with a singlet oxygen quencher.

15. The optical recording disk of claim 1 wherein said protective coat includes
   a lower protective lamina of radiation curable resin on said upper reflective lamina so as to cover at least a recordable region and
   an upper protective lamina of radiation curable resin on said lower protective lamina so as to cover at least the recordable region,
   wherein said lower protective lamina is formed by spin coating and has a thickness of 1 to 10 μm, said upper protective lamina has a thickness of 1 to 15 μm, and said lower and upper protective laminae have a total thickness of 5 to 18 μm.

* * * * *